(12) United States Patent
Smith et al.

(10) Patent No.: US 8,627,930 B2
(45) Date of Patent: Jan. 14, 2014

(54) VARIABLE RESPONSE BUSHING

(76) Inventors: S. Gregory Smith, Yorklyn, DE (US);
Jeffrey Beitzel, Troy, MI (US)

( * ) Notice: Subject to any disclaimer, the term of this patent is extended or adjusted under 35 U.S.C. 154(b) by 0 days.

(21) Appl. No.: 10/390,820

(22) Filed: Mar. 18, 2003

(65) Prior Publication Data

US 2003/0230458 A1 Dec. 18, 2003

Related U.S. Application Data

(60) Provisional application No. 60/365,388, filed on Mar. 18, 2002.

(51) Int. Cl.
*F16F 9/34* (2006.01)
*F16F 13/28* (2006.01)

(52) U.S. Cl.
USPC ............... 188/266.5; 188/282.3; 188/298; 188/321.11; 267/220; 280/5.516; 280/124.155

(58) Field of Classification Search
USPC ........ 188/297, 298, 291, 282.2, 282.3, 282.4, 188/266.2, 266.5, 266.8, 321.11; 267/218, 267/219, 220; 280/124.157, 124.16, 280/124.161, 5.516, 124.155
See application file for complete search history.

(56) References Cited

U.S. PATENT DOCUMENTS

| | | | |
|---|---|---|---|
| 4,153,237 A | 5/1979 | Supalla | |
| 4,266,790 A * | 5/1981 | Uemura et al. | 280/5.514 |
| 4,616,846 A * | 10/1986 | Furuya et al. | 267/140.12 |
| 4,730,816 A | 3/1988 | Eckert | |
| 4,732,244 A | 3/1988 | Verkuylen | |
| 4,784,200 A * | 11/1988 | Fujiwara | 152/209.18 |
| 4,936,423 A * | 6/1990 | Karnopp | 188/266.5 |
| 5,009,451 A * | 4/1991 | Hayashi et al. | 188/321.11 |
| 5,022,501 A * | 6/1991 | Hayashi et al. | 188/321.11 |
| 5,158,270 A * | 10/1992 | Lin | 267/226 |
| 5,183,285 A * | 2/1993 | Bianchi | 280/124.158 |
| 5,219,152 A * | 6/1993 | Derrien et al. | 280/124.159 |
| 5,401,053 A * | 3/1995 | Sahm et al. | 267/221 |
| 5,437,354 A | 8/1995 | Smith | |
| 5,529,153 A * | 6/1996 | Smith | 188/266.2 |
| 5,577,771 A * | 11/1996 | Lee | 267/218 |
| 5,971,115 A | 10/1999 | Smith | |
| 5,979,616 A | 11/1999 | Smith | |
| 5,988,332 A | 11/1999 | Marzocchi et al. | |
| 6,007,072 A * | 12/1999 | Yoon | 280/5.52 |
| 6,390,256 B1 * | 5/2002 | Fruehauf et al. | 188/314 |

FOREIGN PATENT DOCUMENTS

| | | | | |
|---|---|---|---|---|
| DE | 4226754 A1 | 3/1993 | | |
| JP | 57186650 A | * 11/1982 | | |
| JP | 60197419 A | * 10/1985 | | B60G 17/02 |
| JP | 63255110 A | * 10/1988 | | B60G 13/08 |
| JP | 04004334 A | * 1/1992 | | |

* cited by examiner

*Primary Examiner* — Thomas J Williams
(74) *Attorney, Agent, or Firm* — Andrew L. Salvatore; Brian Gomez

(57) ABSTRACT

A bushing having a variable and controllable hardness, and a method of restricting movement comprising using such bushing.

13 Claims, 4 Drawing Sheets

NEUTRAL

COMPRESSED

VARIABLE RESPONSE BUSHING

CROSS-REFERENCE TO RELATED APPLICATIONS

This application claims the benefit of U.S. Provisional Application No. 60/365,388, filed Mar. 18, 2002.

FIELD OF INVENTION

This invention relates to a method and apparatus for controlling tilt or roll of a moving vehicle, particularly during a turn of the moving vehicle. The method and apparatus can also be used in a wide variety of other applications.

BACKGROUND OF THE INVENTION

Typically, a vehicle has a suspension system to help cushion the ride to the driver and passengers and to help the vehicle safely negotiate corners. The components of this suspension system can include the following: Tires, which deform to absorb bumps and return to previous size; Springs, which cushion impact; Shock absorbers located between the axle or frame or struts as part of the axle assembly to dampen the effect of impact, and; Bushings which are placed between the junctions of the above components usually made of rubber.

A problem that can face vehicles is that all bumps or deflections in the road should be absorbed to avoid affecting the driver and passengers. Those bumps or deflections are usually absorbed by the tires. The rubber tire under pressure is able to deform and rebound after encountering small deflections. However, when the same vehicle enters a turn, the tire gives or deforms as pressure is applied to it from the body of the vehicle above. The higher the tire from the rim, the greater the deformation in a turn and, consequently, the more the vehicle rolls to the outside, regardless of the stiffness of the rest of the suspension.

A stiff suspension has been the first traditional choice in an effort to control the roll of the vehicle in a turn. But as explained above, if for example, the tire deforms three inches in a 50 MPH turn, the vehicle will roll to the outside the same three inches, even if the shock or strut does not give at all. In order to counteract this roll, a specifically designed tire, a so-called "low profile" tire can be used. This tire has very little height from the rim. Therefore, there is very little deformation of the tire in a turn and the vehicle corners much better. However, when the vehicle encounters a small deflection the tire does not deform as much as regular tires and the passengers and driver can be significantly jarred by even the smallest bumps.

Even with the use of a stiff suspension and low profile tires, a vehicle can still roll to the outside on the turn because of the bushings used. The conventional bushings are typically made of rubber and there may be two to three bushings for each unit of suspension, each being one half of an inch thick or more. The presence of bushings can allow for a further roll of about one to one and a half an inches depending upon the stiffness (durometer reading) of the bushings, as well as the stiffness of the suspension and the type of tires.

In U.S. Pat. Nos. 5,979,616; 5,971,115; 5,529,153 and 5,437,354, which are incorporated herein by reference, various tilt control systems are described, which allow further softness in the ride of the vehicle in straight line driving but which provide for increased stiffness of the shock/strut/ spring portion of the suspension system when the vehicle enters a turn. However, with any of the systems, even if the shock absorber is very firm, the vehicle can still roll in a turn due to the deformation of the tire and the compression of the bushing. In testing, the roll from these two components on a sport utility vehicle was equivalent to approximately 2 to 3 inches to the outside on a turn.

To compensate for such roll, some prior art has described using a technique of manufacturing the bushings with an air space inside the hard rubber. In this fashion, there is a soft component to the bushing as the air bubble inside is compressed and a hard component as the rubber outside resists compression. However, when the vehicle enters a turn there still will be roll from the bushings very quickly from compression of the air and then further from compression of the rubber.

OBJECTS OF THE INVENTION

A need exists for a bushing having a variable compression and a means of controlling and varying that compression as needed to combat the effects associated with the roll of a vehicle as it turns.

The primary object of this invention is to provide a solution to the problems associated with the roll of the vehicle in a turn and, particularly, to absorb the effect of the small deflections.

A further object is to solve these problems for the occupants of sports cars where low profile tires and a stiff suspension are traditionally used.

SUMMARY OF THE INVENTION

The objects of the invention are accomplished by a bushing of the present invention, which provides a variable and controllable means of cushioning. In straight line driving, the bushings can absorb a significant deflection, usually a two-inch deflection, but it may be much greater or smaller depending on the vehicle characteristics, thereby allowing the vehicle to absorb the bump. However, the bushings of the present invention also allow the vehicle to complete a turn with no roll from the bushings, as well as actively compensating for or preventing any roll from other suspension components. Depending upon the choice of the suspension system, the bushings of the present invention can be incorporated into a vehicle and can reduce or eliminate roll, allowing the ultimate control of the vehicle in a turn. A vehicle having the bushings of the present invention would have the ability to absorb small deflection bumps for passenger comfort, an important improvement over the prior art, while reducing or eliminating compression of the bushing in a turn to significantly reduce roll.

DESCRIPTION OF THE INVENTION WITH REFERENCE TO DRAWINGS

Figure 1:
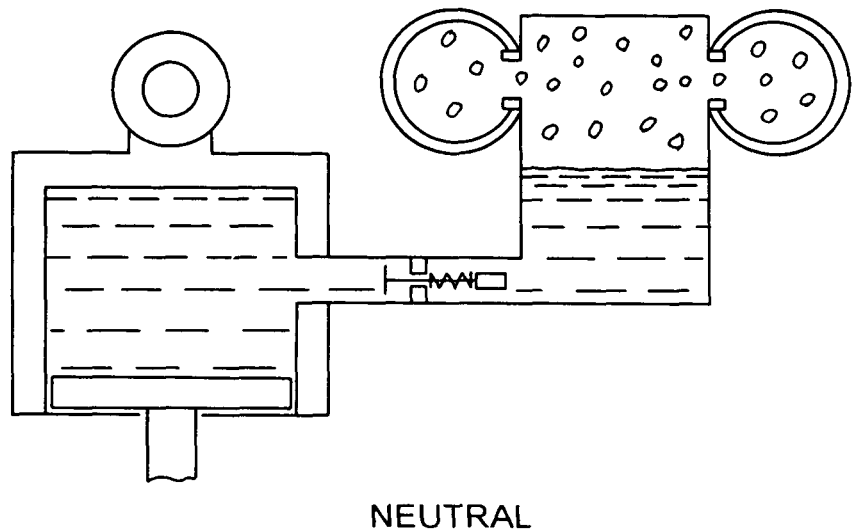
FIG. 1 is a cross sectional view of one embodiment of the bushing of the present invention, incorporated into a suspension having a shock absorber, showing the shock absorber and the bushing in the neutral and in the compressed position.
Figure 1:
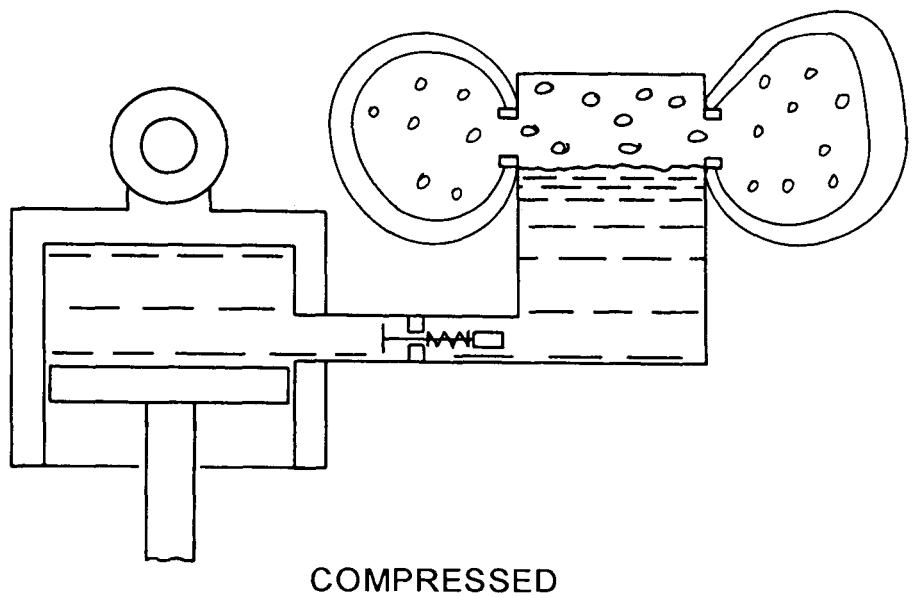
Figure 2:
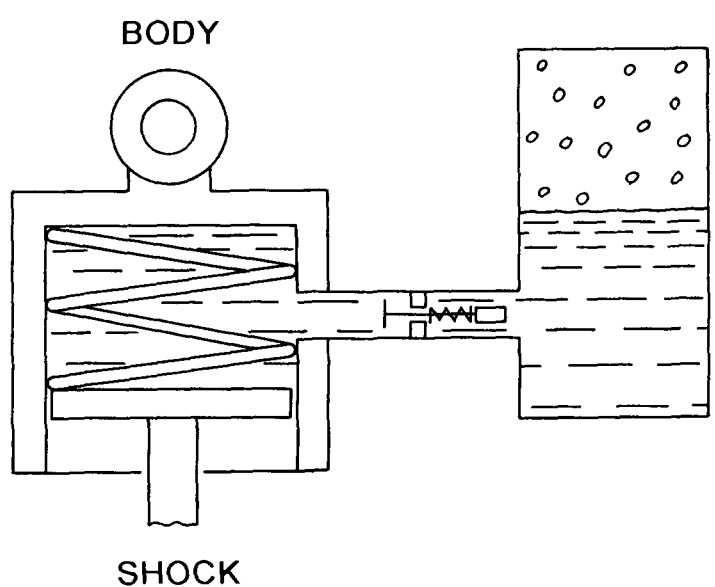
FIG. 2 is a cross section view of an alternate embodiment of a bushing of the present invention.
Figure 3:
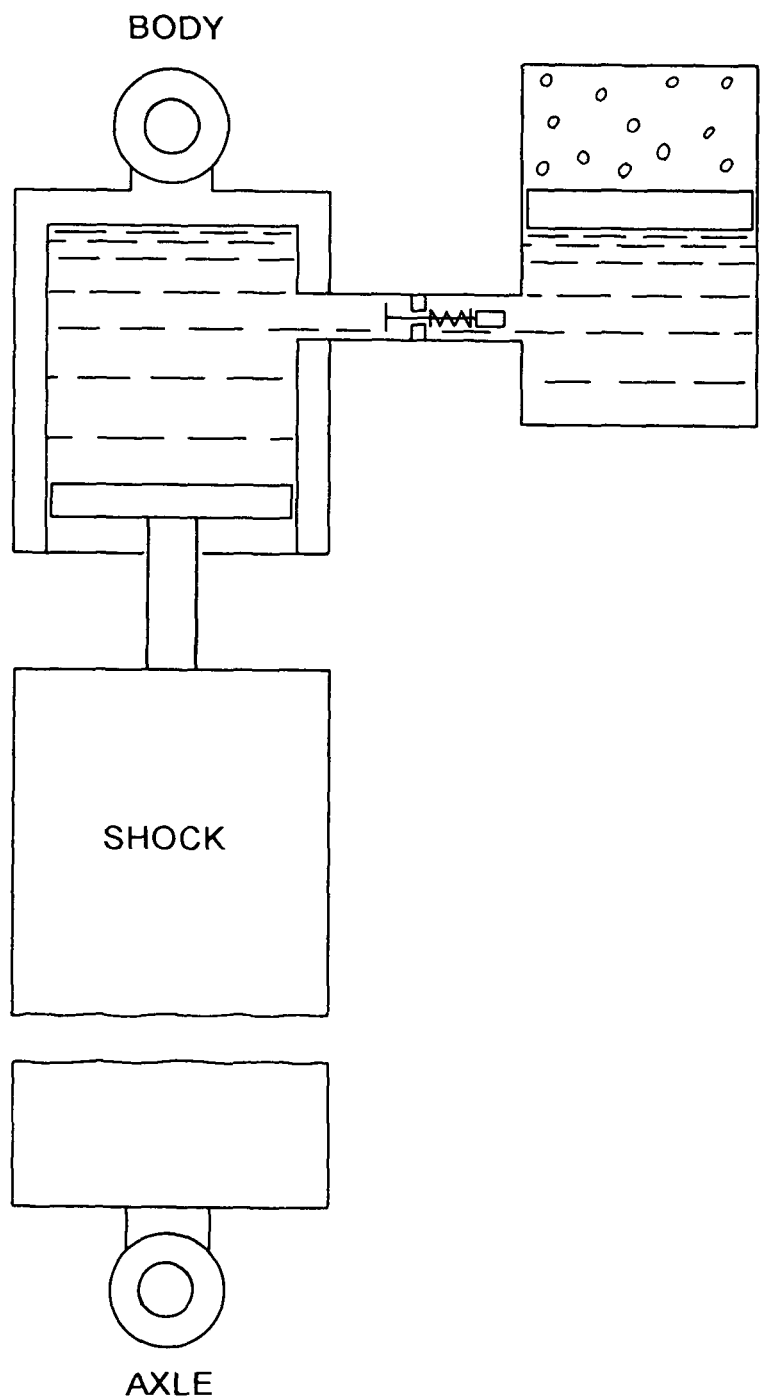
FIG. 3 is a cross sectional view of the bushing of FIG. 2, showing portions of a suspension system in a vehicle.

The variable response-controlled bushings of the present invention, preferred embodiments of which are shown in FIGS. 1-3, operate in the following manner. When the vehicle is in straight line driving the shock absorber acts like a piston, compressing the bushing when a bump is encountered. Depending on the amount of room available between the attachment of the body to the frame, the shock absorber assembly is able to move up or compress the bushing which offers very little resistance as the fluid flows out of the bushing into a second chamber. As the fluid flows into the second chamber pressure builds up in the second chamber to slow or stop the travel of the shock absorber as it reaches the end of its possible travel, this force then urges the piston back down to its resting position and the pressure rapidly reduces to its minimum resting amount.

When the vehicle enters a turn, sensors can direct the bushing to become firm. These sensors can be those that sense steering wheel turn, vehicle tilt, or other means of sensing a turn. The sensing means signals the bushing when the vehicle enters a turn. The sensing means can comprise a computer input or accelerometers, or mechanical sensors, mercury switches, or measuring pressure in the chambers of the bushing and comparing the pressure between bushings or between chambers. The signal from the sensing means can be transmitted electrically to the variable response bushing which then seals or restricts access to the second chamber so little or no fluid egresses. In this manner no compression or minimal compression of the bushing occurs and the shock absorber unit does not travel or minimally travels so that movement of the axle towards the frame is reduced or eliminated.

It should be understood that the variable response bushing could be used in any location in which compression of a bushing occurs on a vehicle. For example, the bushings of the present invention could be located adjacent to the struts, anti roll devices, or sway bars, of a vehicle. The bushings of the present invention can also be adapted for receiving inputs other than that provided from the sensing means if such a characteristic is required. Such a modification involves programming and or altering the signal sent to the bushing, and varying the device sending the signal.

As shown in FIG. 1, the bushing can comprise a housing (the bushing chamber) which can be attached to the frame of the vehicle; a piston assembly which can rest on top of the shock or strut; fluid which can fill the chamber; a second chamber to which the fluid can egress; a sealing means such as a solenoid valve which receives input from the sensing means to restrict or prevent the flow of fluid out of the bushing chamber. The second chamber in this embodiment can have the same construction as a traditional tire, i.e. rubber walls filled with air with a separation means between the air and the hydraulic fluid therein. Instead of a separation means such as a float the device could be oriented such that the air would rise to an appropriate location and not enter into the first chamber. Instead of air the second chamber can be filled with a suitable liquid and would perform similarly.

On encountering a small bump or deflection, the shock assembly would move upward (if a low profile tire is used this movement would occur more quickly than if a high profile tire were used). This movement of the shock moves the piston up and the fluid flows out of the first chamber into the second where the air is subjected to this force, thus deforming the "mini tire" component of the bushing. The rubber expands, absorbing the deflection, and then contracts, transmitting the forces back as they came, eventually pushing the piston back to the starting position.

If the vehicle were sensed to enter a turn, input would instruct a solenoid valve to close (in this embodiment of sealing means) preventing fluid flow out of the first chamber. This prevents any movement of the shock assembly toward the axle or frame, i.e., there is no shortening of the distance between the axle and the frame from the bushing. Any further movement will be due to the characteristics of the shock/strut assembly.

A second embodiment includes a coiled spring resting on top of the piston within the housing. Its function is to help return the bushing to the starting or neutral position. The second chamber would then be a reservoir for the fluid movement.

In a third embodiment, the second chamber contains a pressurized gas, such as nitrogen, on top of a float separating the fluid from the gas. The pressure of the nitrogen could be variably adjusted to allow compression to absorb the deflection and then the expansion of the nitrogen would return the busing to the neutral position. The pressure of the nitrogen or other gas could be actively varied to compensate for different driving conditions.

A variety of further embodiments can be used for the sealing means. These can include pressurized fluid, regulated from a pump, such as that found in the power steering mechanism of a vehicle. The pressurized power steering fluid can be attached to the second chamber. In this complicated embodiment, one would probably still require a sealing means to prevent back flow into the power steering reservoir and beyond, depending upon the pressures achieved by the bushing and power steering pump. Pressure sensors in the first and second chambers can be used to relay to a computer where further input could also be added. The inflow from a pump could also be used. This information could then relay back to a pressure relief valve which would regulate the amount of pressure delivered from the power steering pump. This type of system could then provide sealing when required, pressure to extend the distance between the body and the frame by returning fluid to the first chamber (returning the bushing to its full size), diminishing pressure to allow this distance to compress when bumps are encountered. This type of system would allow for a wide range of variability in the hardness and rate of response of the bushing.

If desired, valving such as used in a conventional shock absorber could also be incorporated as or as part of the sealing means.

Sensing means could include accelerometers of a variety of types to detect the vehicles entering into a turn, movement of the body toward the axle or vice versa, lateral acceleration, another tilt sensing means such as described in U.S. Pat. Nos. 5,979,616, 5,971,115; 5,529,153 and 5,437,354. A further sensing mechanism could include the turning of the steering wheel itself past a certain predetermined point.

Figure 4:
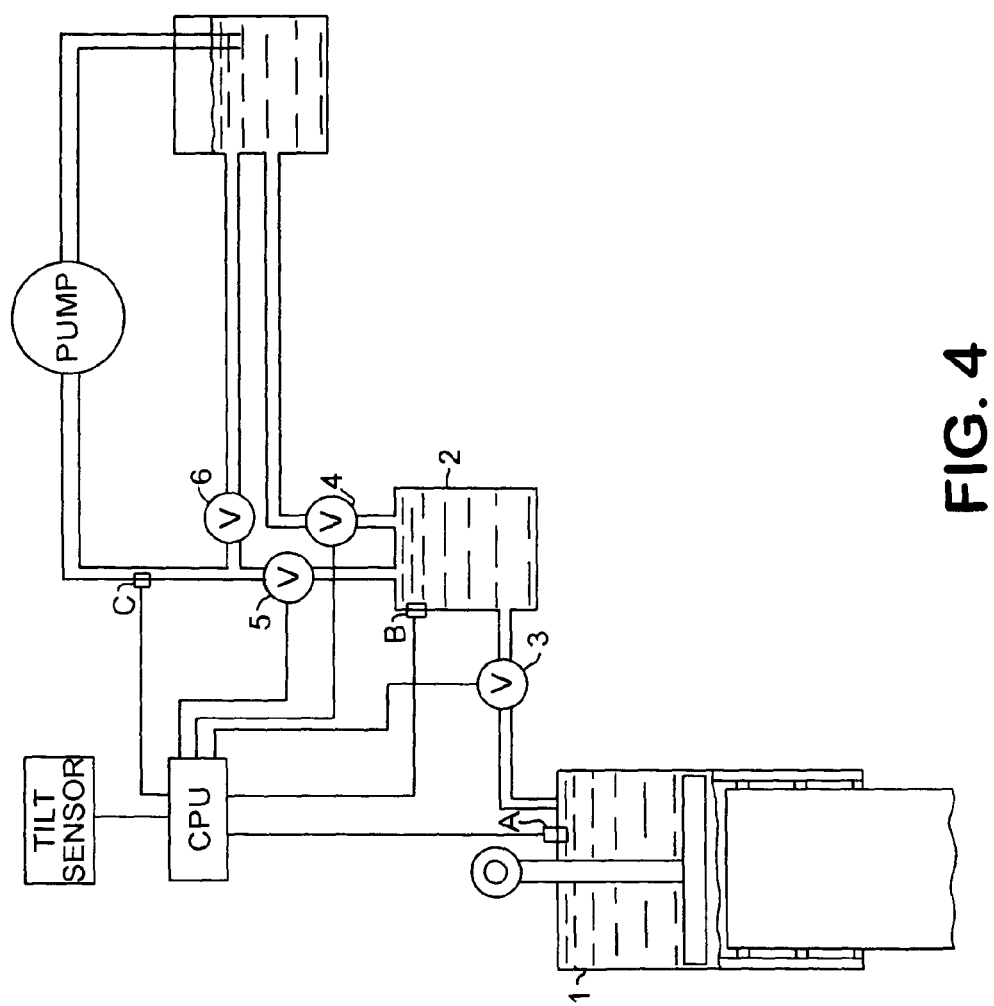
FIG. 4 is a schematic of the process of the present invention.

In FIG. 4, an embodiment of a bushing of the present invention is shown with a schematic of a process of the present invention. In FIG. 4, 2 scenarios are shown. In the first scenario, a vehicle with a suspension comprising a bushing of the present invention enters a turn. As the tilt sensor senses that the vehicle is tilting in the turn, it communicates with the CPU, which directs the closing of valve number 3, preventing fluid flow from the first chamber into the second, and thus reducing roll. In the second scenario, the vehicle encounters a bump, and as the fluid moves from chamber one to chamber two, the pressure sensor notes this and communicates with the CPU, which regulates the pressure with the assistance of input from sensor C and form the pump. The CPU then causes valves 4 and 5 to open, allowing pressure to be reduced, then closes valves 4 and 5 to increase pressure.

The invention claimed is:
1. A suspension system in vehicle comprising:
   at least one shock absorber having a piston or ram at one end, at least one active and variable response bushing connected to the shock absorber, the bushing having a variable response rate for absorption of deflections while driving and comprises a first chamber with the piston or ram located therein, the first chamber being connected to and positioned between the shock absorber and a frame of the vehicle, at least one remote chamber or vessel connected to the first chamber, conduits connecting the first chamber with the remote chamber or vessel, fluid within at least one of the chambers, means to convey the fluid from one chamber to another, wherein the means for conveying the fluid is a pump, or a flexible or elastomeric chamber, or a coil spring adapted to urge the first chamber to its initial position, means of controlling the pressure in the remote chamber or vessel, comprising either the pump, the flexible or elastomeric chamber, or the coil spring, valving or sealing means comprising pistons or constriction of the conduit to close or restrict the conveyance of fluid, and sensing means selected, from the group consisting of accelerometers, computers, pressure sensors, and linear movement sensors for sensing tilt and wherein the sensing means is adapted to communicate with said valving or sealing means.

2. The bushing of claim 1 wherein the means for conveying the fluid is a pump.

3. The active and variable response bushing of claim 1 in which the means for conveying the fluid is a flexible or elastomeric chamber.

4. An active and variable response bushing of claim 1 further comprising a coil spring adapted to urge the first chamber to its initial position.

5. A suspension system as set forth in claim 1 further comprising at least one low profile tire connected to the shock absorber.

6. A vehicle with at least one axle, a frame, two wheels, at least one shock absorber having a piston or ram at one end connected to at least one wheel and to the frame, and an active and variable response bushing being of any size, and the bushing having a variable response rate for absorption of deflections while driving and which bushing comprises a first chamber with the piston or ram located therein, the first chamber being connected to and positioned between the shock absorber and the frame of the vehicle, at least one remote chamber or vessel connected to the first chamber, conduits connecting the first chamber with the remote chamber or vessel, fluid within at least one of the chambers, means to convey the fluid from one chamber to another, wherein the means for conveying the fluid is a pump, or a flexible or elastomeric chamber, or a coil spring adapted to urge the first chamber to its initial position, means of controlling the pressure in the remote chamber or vessel, comprising either the pump, the flexible or elastomeric chamber, or the coil spring, valving or sealing means comprising pistons or constriction of the conduit to close or restrict the conveyance of fluid, and sensing means selected from the group consisting of accelerometers, computers, pressure sensors, and linear movement sensors for sensing tilt of the vehicle and wherein the sensing means is adapted to communicate with said sealing means.

7. A vehicle as in claim 6 further comprising at least one low profile tire connected to one of the wheels.

8. A suspension system comprising at least one shock absorber having a piston or ram at one end, a frame, and at least one active and variable response bushing in a vehicle, and a bushing mechanism for restricting or preventing movement comprising;
   a. means for sensing said movement to be prevented or reduced;
   b. means for notifying the mechanism of said movement;
   c. means for restricting or preventing flow of fluid from a first chamber to at least one remote chamber, said first chamber having the piston or ram located therein, the first chamber being connected to and positioned between the shock absorber and the frame of the vehicle, and said remote chamber being located anywhere in said vehicle and said first chamber and said remote chamber being of any size; and
   d. means for returning fluid from the remote chamber to the first chamber.

9. A suspension system as in claim 8 further comprising at least one low profile tire.

10. In a vehicle suspension system comprising at least one shock absorber having a piston or ram at one end and at least one active and variable response bushing in a vehicle, a method for restricting or preventing movement while allowing absorption of deflections comprising;
   a. locating a first compressible chamber between at least two structural elements;
   b. compressing said first chamber allowing fluid to exit into at least one remote chamber or vessel, said remote chamber receiving, fluid and increasing its force to return fluid to the first chamber, said first chamber with the piston or ram located therein, the first chamber being connected to and positioned between the shock absorber and a frame of the vehicle, and said remote chamber being located anywhere in said vehicle and said first chamber and said remote chamber being of any size;
   c. using a sensing means for detecting movement to be prevented; and
   d. communicating to a sealing or valving means to prevent or restrict fluid from moving to the remote chamber from the first chamber.

11. In a vehicle comprising a body, an axle, and a suspension system comprising at least one active and variable response bushing, and at least one shock absorber having a piston or ram at one end, a method of controlling the movement of the body of the vehicle relative to the axle of the vehicle comprising; controlling the hardness of at least one bushing by actively managing the pressure of a hydraulic fluid within the bushing, said bushing comprising a first chamber and at least one remote chamber, said first chamber having the piston or ram located therein and being connected to and positioned between the shock absorber and a frame of the vehicle, and said remote chamber being located anywhere in said vehicle and said first chamber and said remote chamber being of any size.

12. In a suspension system in a vehicle comprising at least one active and variable response bushing for absorption of deflections the bushing comprising a first chamber and at least one remote chamber, said first chamber being connected to and positioned between a shock absorber and a frame of a vehicle, the shock absorber having a piston or ram at one end, and the piton or ram being located within the first chamber, and said remote chamber being located anywhere in said vehicle and said first chamber and said remote chamber being of any size, a method of restricting or preventing movement in the bushing comprising:
- a. setting a point of minimum or maximum movement to be tolerated;
- b. sensing when said vehicle attains said point of minimum or maximum movement; and
- c. applying an opposing force to the force generated by the movement by either preventing or reducing the flow of a hydraulic fluid between said first chamber and said remote chamber within the bushing.

13. An active and variable response bushing with a variable response rate for absorption of deflections comprising a first chamber with a piston or ram of a shock absorber located therein, the first chamber being located in an area of compression, at least one remote chamber or vessel connected to the first chamber able to receive fluid from first chamber or vessel, means for the remote chamber to return said fluid under pressure after receiving it, means for sealing or reducing the communication between the first and remote chamber responsive to electrical input, sensor or sensors to signal said sealing means, and blocking or reducing the flow of fluid from the first chamber or vessel to the remote chamber or vessel as commanded.

* * * * *